United States Patent [19]

Normile

[11] Patent Number: 5,703,697
[45] Date of Patent: Dec. 30, 1997

[54] METHOD OF LOSSY DECODING OF BITSTREAM DATA

[75] Inventor: James Normile, Woodside, Calif.

[73] Assignee: LG Electronics, Inc., San Jose, Calif.

[21] Appl. No.: 618,847

[22] Filed: Mar. 20, 1996

[51] Int. Cl.[6] .................................. H04N 1/415
[52] U.S. Cl. ........................... 358/433; 358/261.1
[58] Field of Search ........................ 358/432–433, 358/426–428, 261.1–261.4, 906; 382/262, 272, 268; 348/607, 625

[56] References Cited

U.S. PATENT DOCUMENTS

| | | | |
|---|---|---|---|
| 4,546,390 | 10/1985 | Konishi et al. | 360/10.3 |
| 5,113,256 | 5/1992 | Citta et al. | 358/133 |
| 5,267,036 | 11/1993 | Habraken et al. | 358/133 |
| 5,555,028 | 9/1996 | Kim | 382/262 |
| 5,555,029 | 9/1996 | Kim | 382/262 |
| 5,565,991 | 10/1996 | Enari | 358/261.1 |

*Primary Examiner*—Edward L. Coles, Sr.
*Assistant Examiner*—Stephen Brinich
*Attorney, Agent, or Firm*—Peninsula IP Group; Douglas A. Chaikin

[57] ABSTRACT

Disclosed herein is a method of lossy decoding of bitstream data. The method comprises the steps of decoding the bitstream data having a plurality of symbols to provide an image stream having a plurality of image blocks, marking an image block with a first identifier having a spatial position associated with a location when an invalid symbol is encountered, discarding the bitstream data until a resynchronization code is decoded, marking the image block associated with the resynchronization code with a second identifier, decoding the image stream to provide a plurality of display frames having a plurality of display blocks, comparing the display blocks of a display frame for similarity between the display blocks of a previous display frame to determine display blocks having errors, and replacing the display blocks having errors with previous display blocks corresponding to a similar spatial position.

20 Claims, 4 Drawing Sheets

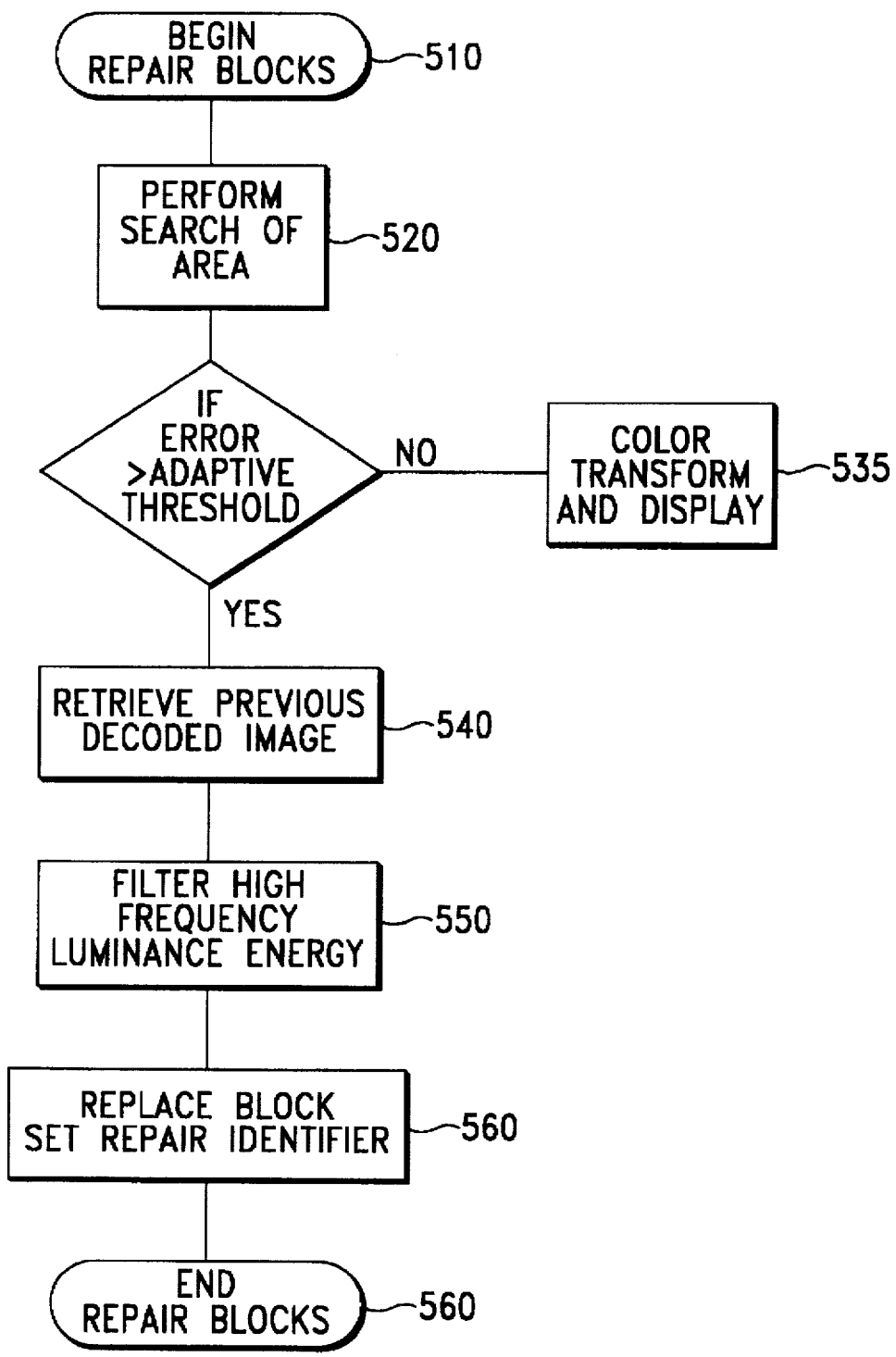
FIG.−5

METHOD OF LOSSY DECODING OF BITSTREAM DATA

BACKGROUND OF THE INVENTION

1. Field of the Invention

The present invention relates to data compression audio and video data and more particularly to an improved method of detecting and repairing damaged compressed bitstream data.

2. Description of Previous Art

Data compression is often used to reduce the amount of data required for transmission over limited bandwidth channels. Examples of data that is often compressed are audio and video data. A fundamental goal of data compression is its ability to decompress the data at the so-called real-time performance rate. MPEG (Moving Pictures Experts Group), an ISO/IEC (International Organization for Standardization/ International Electrotechnical Commission) standard for medium quality and medium bit rate video and audio compression, is an example data compression type. MPEG video compression removes spatial redundancy within a video frame and temporal redundancy between video frames. DCT-based (Discrete Cosine Transform) compression is used to reduce spatial redundancy. Motion compensation is used to exploit temporal redundancy. The images in a video stream usually do not change much between small time intervals. The idea of motion compensation is to encode a video frame based on other video frames temporally close to it.

A problem that often arises during decoding of a video stream is that synchronization information is lost. Synchronization information contains data that enables the examination of an arbitrary point in the bitstream and determining the position, spatially or temporally in the video sequence. Also, errors are often introduced during transmission that are not detected or corrected by existing error detection and correction mechanisms. When errors are introduced, crucial synchronization information, for example, are lost causing conventional decoders to not perform well.

Therefore, it is desirable to provide a method for lossy decoding of a bitstream data well suited for high error rate transmissions of audio/video data. Significant advances in video and audio conference can be realized when conferencing can continue in the presence of errors in transmission. Furthermore, the ability to determine errors and recovery from the errors in lossy transmission channels such as telephone lines greatly aids the field of video conferencing systems.

SUMMARY OF THE INVENTION

It is an object of this invention to provide a method of determining the location of erroneous data.

It is an additional object of this invention to provide a method of replacing erroneous data with visually similar data.

It is an additional object of this invention to provide a method of retaining good quality in a repaired area until valid data is obtained.

In accordance with the above objects and those that will be mentioned and will become apparent below, the method of lossy decoding of bitstream data in accordance with this invention comprises the steps of decoding the bitstream data having a plurality of symbols to provide an image stream having a plurality of image blocks, marking an image block with a first identifier having a spatial position associated with a location when an invalid symbol is encountered, discarding the bitstream data until a resynchronization code is decoded, marking the image block associated with the resynchronization code with a second identifier, decoding the image stream to provide a plurality of display frames having a plurality of display blocks, comparing the display blocks of a display frame for similarity between the display blocks of a previous display frame to determine display blocks having errors, and replacing the display blocks having errors with previous display blocks corresponding to a similar spatial position.

According to one aspect of the invention, the method includes comparing the display blocks in an area corresponding to the spatial position of the first identifier. If the display blocks in the area corresponding to the spatial position of the first identifier does not contain similar data, then display block errors can be located within a display frame.

In another aspect of the invention, the method includes filtering block edges of replaced blocks to smoothen transitions between replaced blocks and not replaced blocks. In this way, the invention provides a method of replacing erroneous data with visually similar data.

A method of lossy decoding of bitstream data is provided which provides determination of erroneous block data, replacement of the erroneous block data, smooth transitions from good data and replaced data, and retention of good quality in the repaired area until the repaired area is replenished with new valid data.

Other aspects and advantages of the present invention can be seen upon review of the figures, the detailed description, and the claims which follow.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIG. 5 is a repair blocks flow diagram of the repair errors block in accordance with the invention.

DETAILED DESCRIPTION OF THE INVENTION

Figure 1:
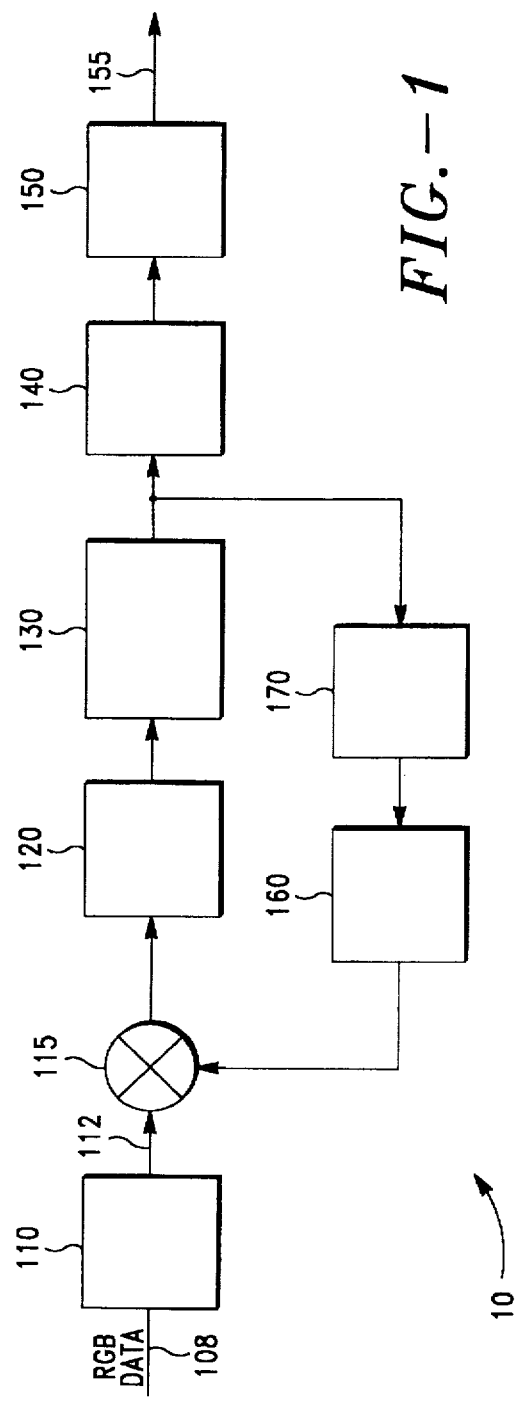
FIG. 1 is a block diagram of a video encoder as generally known in the video encoding arts.

The invention will now be described with respect to the Figures, in which a preferred embodiment of the invention is generally shown. FIG. 1 shows a block diagram of a video encoder 10 as generally known in the video encoding arts. Red Green Blue (RGB) data on line 108 provides the video input RGB converter 110. The RGB converter 10 codes the RGB data to luminance and two color difference components y,u, and v. The RGB converter 110 provides an output on line 112 to an integrator 115. The integrator 115 integrates the output from the frame reconstruct and motion estimation block 160 and the yuv data on line 112. The Discrete Cosine Transform (DCT) block 120 provides the input to the quantizer 130. The output of the quantizer 130 provides inputs to the Huffman encoder 140 and the inverse quantizer 170. The output of the inverse quantizer 170 provides the input to the frame reconstruct and motion estimation block 160. The DCT block 120, quantizer 130, inverse quantizer 170, and the frame reconstruct and motion estimation block 160 provide the Motion Picture Experts Group (MPEG) encoding. The MPEG encoding provides a plurality of display frames wherein each display frame includes a plurality of display blocks. Other video encoding techniques such as H261 and H263 standards are also encoded in the similar manner. The H261 and H263 standards are used for implementing video teleconferencing.

The Huffman encoder 140 receives inputs from the quantizer 130 and Huffman encodes the MPEG encoded data for example. The output of Huffman encoder 140 provides the input data compressor 150. The data compressor 150 packs the Huffman encoded data to provide compressed bitstream data for transmission on line 155.

Figure 2:
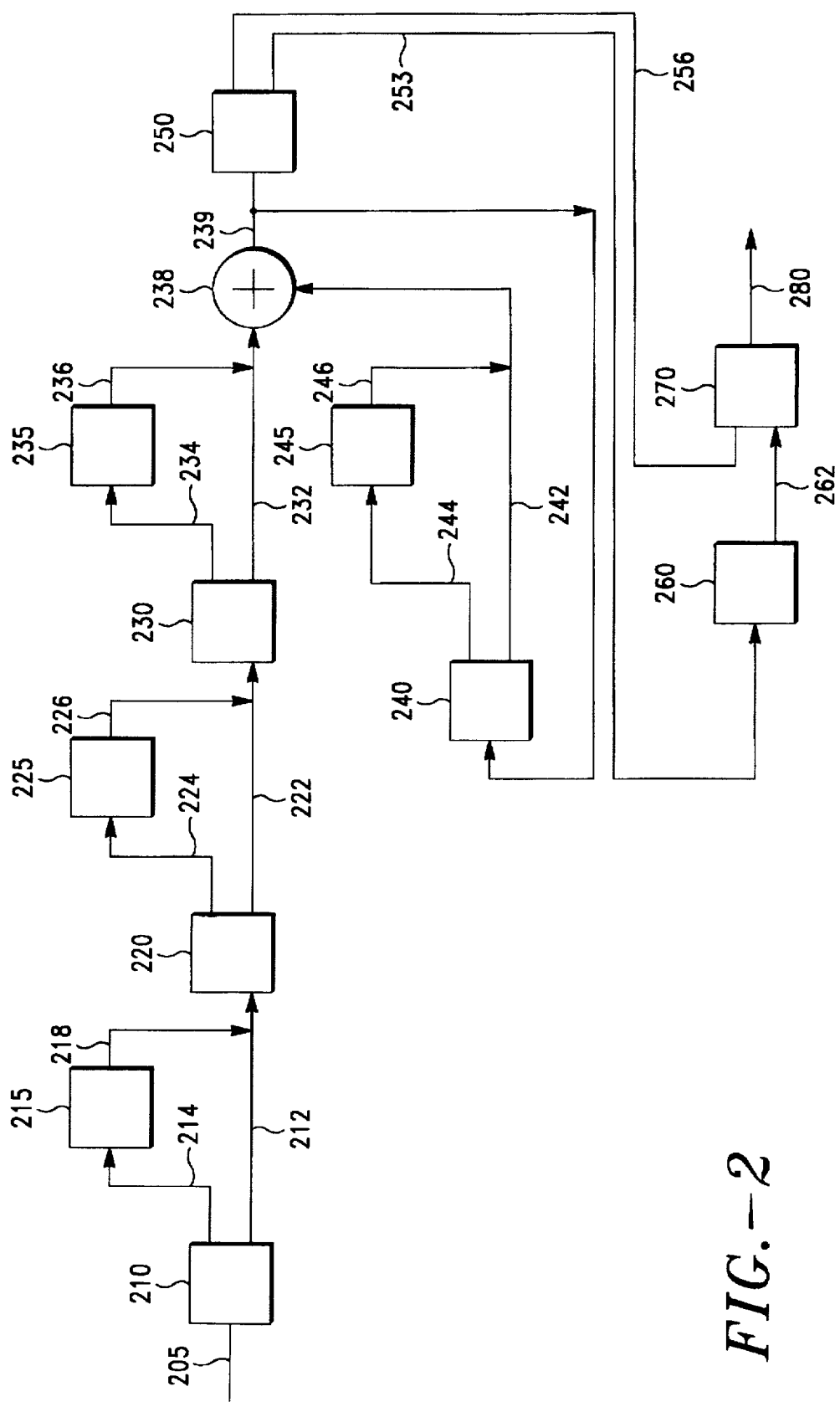
FIG. 2 is an embodiment of a video decoder for lossy decoding of the compressed bitstream data according to the present invention.

FIG. 2 shows an embodiment of a video decoder 20 for lossy decoding of the compressed bitstream data according to the present invention. The bitstream data from line 155 is received on line 205. The bitstream data on line 205 provides the input to Huffman decoder 210. The Huffman decoder 210 decodes the incoming lossy coded bitstream data on line 205 and provides an output of the decoded image blocks on line 212. An error is detected when an invalid symbol is encounter during the decoding of the bitstream data. As the error is detected, the Huffman decoder 210 provides an output of the bitstream on line 214 to a Huffman error handler 215. The Huffman error handler 215 receives the bitstream data on line 214 and provides an output on line 218. The output on line 218 is coupled to line 212. Line 212 provides the decoded Huffman bitstream which includes an image stream having a plurality of image blocks.

Figure 3:
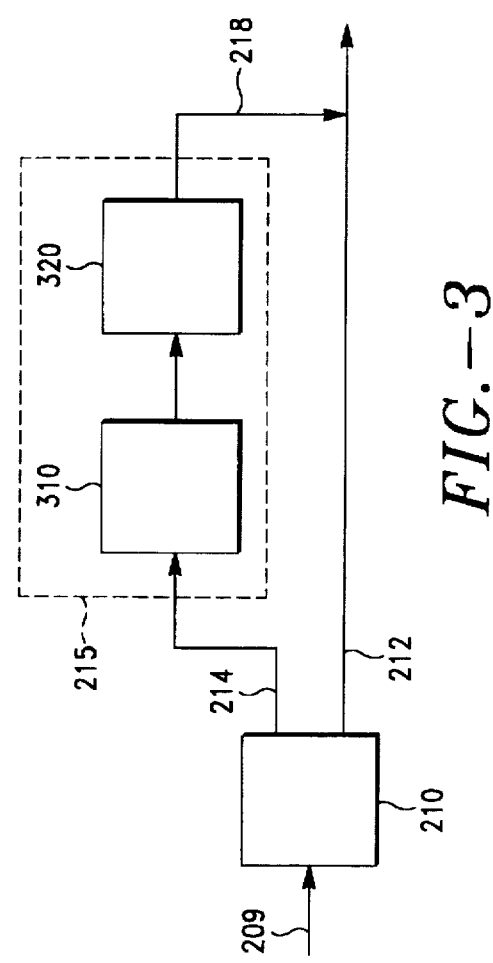
FIG. 3 is a block diagram of the Huffman error handler in accordance with the present invention.

FIG. 3 shows a block diagram of the Huffman error handler 215. Image block marker 310 of the Huffman error handler 215 sets a invalid symbol identifier associated with the invalid symbol in the bitstream. The invalid symbol identifier provides the spatial position of the invalid symbol within the bitstream. Resynch identifier 320 discards bits in the bitstream until a resysnchronization code is identified. The resynchronization code provides a reference to begin decoding the bitstream. Once the resynchronization code is identified, the resync identifier 320 sets a valid symbol identifier that is associated with the spatial position of the resynchronization code within the bitstream. The Huffman decoder 210 returns to decoding the bitstream and provides the output of the decoded image blocks on line 214. If additional errors are encountered during the decode, the Huffman decoder 210 directs the bitstream data to the Huffman error handler 215 to identify the spatial position of the errors within the image stream.

Referring again to FIG. 2, the image stream on line 212 is received by the inverse quantizer 220 which performs an inverse quantize of the image stream. The inverse quantizer 220 retrieves quantized values and performs a check of the quantized values. If the quantized value is within range of quantized values, the inverse quantizer 220 provides an output on line 222. If the quantized value is out of bounds of quantized values, the inverse quantizer 220 provides an output on line 224. Repair quantize value 225 receives the out of bounds quantized value on line 224 replaces another quantized value that is within range of quantized values. In one embodiment, the repair quantize value 225 logs a list of recent quantized values and replaces out of bounds quantized values with the average of the logged quantized values.

The repair quantize values 225 provides an output on line 226. Line 226 is coupled to line 222 and provides the input to inverse DCT 230. In an alternate embodiment, the repair quantize value 225 logs the x, y coordinate of the error location within the frame for down stream processing. Even information specifying the type of error may be logged for use in later error correction.

The image stream on line 222 is received by the inverse DCT 230 which performs an inverse DCT of the image stream. The inverse DCT 230 retrieves DCT values and performs a check of the DCT values. If the DCT value is within range of DCT values, the inverse DCT 230 provides an output on line 232. If the DCT value is out of bounds of DCT values, the inverse DCT 230 provides an output on line 234. Repair quantize value 235 receives the out of bounds DCT value on line 234 and replaces another DCT value that is within range of DCT values. In one embodiment, the repair DCT value 235 logs a list of recent DCT values and replaces out of bounds DCT values with the average of the logged DCT values. The repair DCT values 235 provides an output on line 236. Line 236 is coupled to line 232 and provides the input to summing node 238. The summing node 238 provides inputs to repair image block 250 and motion vector block 240 on line 239. In an alternate embodiment, the repair DCT value 235 logs the x, y coordinate of the error location within the frame for down stream processing. Even information specifying the type of error may be logged for use in later error correction.

The image stream on line 239 is received by the motion vector block 240 which reconstructs the previous frame and provides a motion vector. The motion vector block 240 performs a check of the motion vector values. If the motion vector value is within bounds of motion vector values, the motion vector block 240 provides an output on line 242. If the motion vector value is out of bounds of motion vector values, the motion vector block 240 provides an output on line 244. Repair motion vector value 245 receives the out of bounds motion vector value on line 244 and replaces another motion vector value that is within range of motion vector values. In one embodiment, the repair motion vector value 245 logs a list of recent motion vector values and replaces out of bounds motion vector values with the average of the logged motion vector values. The repair motion vector values 245 provides an output on line 246. Line 246 is coupled to line 242 and provides an input to summing node 238. In an alternate embodiment, the repair motion vector value 245 logs the x, y coordinate of the error location within the frame for down stream processing. Even information regarding the type of error may be logged for use in later error correction.

Check block 250 receives the image stream on line 239 from the summing node 238 and performs two checks of the image stream. First, check block 250 checks for errors logged in the image stream. If the check block 250 detects errors logged in the image stream, check block 250 directs the output on line 253 to repair errors block 260. Repair errors block 260 provides an output of the repaired image frame on line 262. Secondly, if the check block 250 does not detect errors logged in the image stream, check block 250 performs a check for similarity between blocks of the decoded image frame and a previous decoded image frame. If check block 250 detects that the similarity values of current decoded image blocks in a surrounding area differ from the previous decoded image blocks by an amount greater than a similarity threshold, then check block 250 identifies the image block and also directs the output on line 260 to the repair errors block 260. If the similarity values of the current decoded image blocks in the surrounding area are within the similarity threshold of the previous decoded image blocks, then the check block 250 directs the output on line 256 to yuv to RGB converter 270. The yuv/RGB converter converts the image frame for display and provides an output on line 280. A smart encoder can improve the robustness of the check for similarity if the smart encoder assures that the encoded bitstream data of the image frames is within the similarity threshold.

Figure 4:
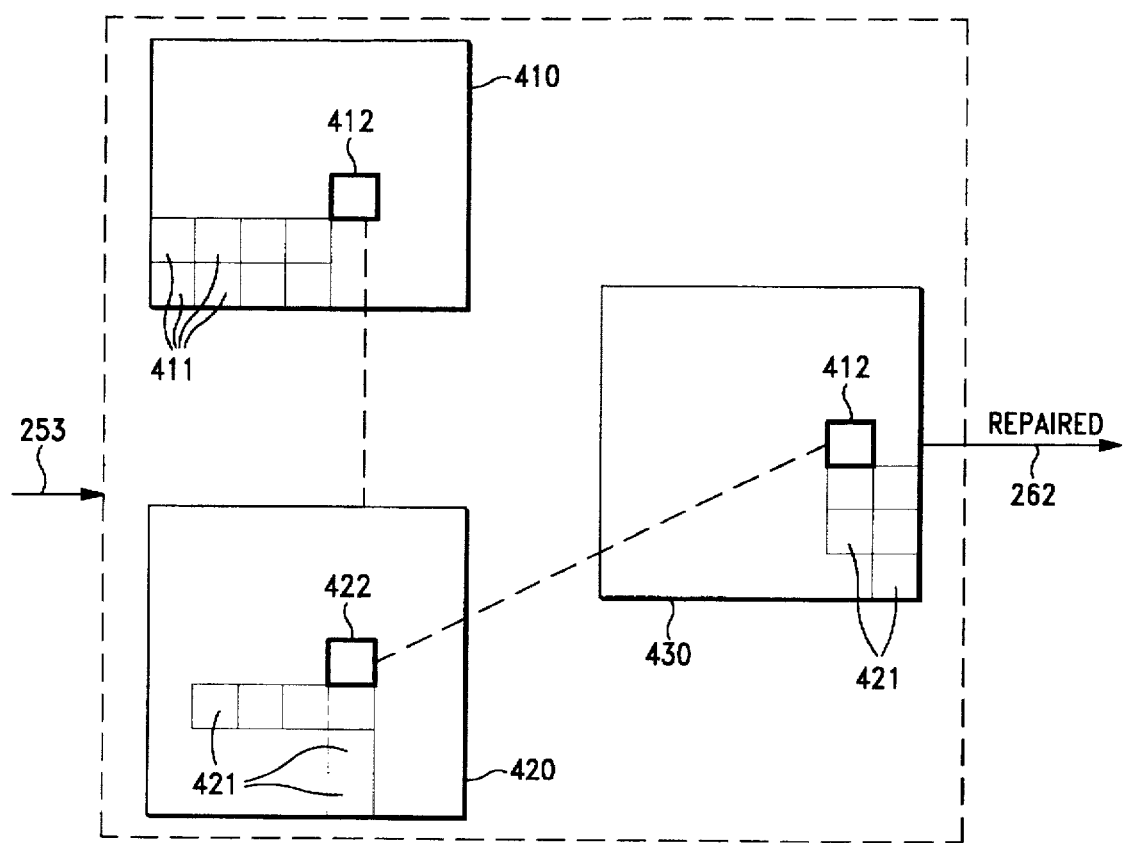
FIG. 4 is a block diagram of the repair errors block in accordance with this invention.

FIG. 4 shows a block diagram of the repair errors block 260. A current frame 420 includes a plurality of current image blocks 421. Current image block 422 has been detected to include errors. Thus, the repair errors block 260 retrieves previous frame 410 having the plurality of previous image blocks 411. Previous image block 412 corresponds to the spatial position of current image block 422. The repairs errors block 260 replaces the current image block 422 of the current image frame 420 with the previous image block 412 of the previous image frame 410. Repaired image frame 430 includes current image blocks 421 of the current image frame 420 and the previous image block 412 of the previous image frame 410. Thus, the repairs errors block 260 replaced the erroneous image block 422 with the previous image block 412 and provides an output for the repaired image block 430 on line 262.

FIG. 5 shows a repair blocks flow diagram of the repair errors block 260. The flow diagram begins with isolate error blocks in step 510. The decoded image frame is checked for similarity between the blocks to isolate the error blocks. In step 520, a search is performed around the area where identifiers have marked the erroneous blocks. If any blocks in the search area differ by an amount greater than an adaptive threshold, then it is determined in step 530 that these are the blocks which are in error. If any blocks in the search area differ by an amount less than the adaptive threshold, then it is determined that those blocks are not in error. In step 535, the image blocks are color transformed for output display.

Once step 530 determines the blocks within an image frame that contain the erroneous data, step 540 retrieves a previous decoded image frame from memory. The block data of the previous decoded image frame corresponding to the spatial position of the error blocks is retrieved from memory. Step 550 performs a filtering operation on the block data of the previous decoded image frame. The filtering operation reduces the effect of high frequency luminance energy to reduce the fine details of the previous image which may be inaccurate and should not be used to replace erroneous data. Next, in step 560, the filtered block data having the corresponding spatial position of the error block replaces the block data of the error block. Step 560 also sets a repair identifier associated with the repaired block. Further filtering operation is performed on the edges of the replaced block data to smoothen transitions from normal block to the replaced block. Step 590 ends the repair blocks flow diagram.

On subsequent block repair operations, repaired blocks having the repair identifier associated with it provide the low frequency interframe information. Repaired blocks provide the DC component for motion compensation of other error blocks. The DC component for motion compensation minimizes the amount of motion compensation provided to the error blocks. When an intra coded block is decoded at the spatial position for a repaired block, the repair identifier is cleared. Intra frames are not sent as often because intra frames are much larger than inter frames. The intra frames contain all information relating to the frame data while the inter frame are much smaller and contain additional frame information that is to be added to the previous frame.

While the foregoing detailed description has described several embodiments of the method of lossy decoding for bitstream data in accordance with this invention, it is to be understood that the above description is illustrative only and not limiting of the disclosed invention. Obviously, many modifications and variations will be apparent to the practitioners skilled in this art. Accordingly, the method lossy decoding of bitstream data has been provided which enables continuous transmission of decoded lossy data in the presence of errors. Audio and video transmissions are greatly enhanced by repairing erroneous block data of the frame data. Teleconferencing over standard telephone lines are more easily realized. Lossy data of many forms can take advantage of the method of lossy decoding as described in the detailed description. It is intended that the scope of the invention be defined by the following claims and their equivalents.

What is claimed is:

1. A method of lossy decoding of a bitstream data comprising the steps of:

decoding the bitstream data having a plurality of symbols to provide an image stream having a plurality of image blocks;

marking an image block with a first identifier having a spatial position associated with a location when an invalid symbol is encountered;

discarding the bitstream data until a resynchronization code is decoded;

marking the image block associated with the resynchronization code with a second identifier;

decoding the image stream to provide a plurality of display frames having a plurality of display blocks;

comparing the display blocks of a display frame for similarity between the display blocks of a previous display frame to determine display blocks having errors; and replacing the display blocks having errors with previous display blocks corresponding to a similar spatial position.

2. The method of lossy decoding of a bitstream data according to claim 1, wherein the step of comparing the display blocks for similarity includes the step of marking spatial positions of blocks having errors that requires replacement.

3. The method of lossy decoding of a bitstream data according to claim 2, wherein the step of marking blocks having errors includes marking the spatial position of the second identifier.

4. The method of lossy decoding of a bitstream data according to claim 4, wherein the second identifier indicates spatial positions of display blocks not having errors.

5. The method of lossy decoding of a bitstream data according to claim 2, wherein the step of marking blocks having errors includes marking the spatial position of the first identifier.

6. The method of lossy decoding of a bitstream data according to claim 4, wherein the step of comparing the display blocks for similarity includes the step of comparing the display blocks corresponding to the spatial position of the first identifier.

7. The method of lossy decoding of a bitstream data according to claim 5, wherein the step of comparing the display blocks for similarity includes the step of comparing the display blocks in an area corresponding to the spatial position of the first identifier.

8. The method of lossy decoding of a bitstream data according to claim 1 further comprises the step of identifying the display blocks as repaired blocks when the display blocks have been replaced with previous display blocks.

9. The method of lossy decoding of a bitstream data according to claim 8 further comprises the step of clearing an identified display block as a repaired block when an intra coded block replaces a display block having errors.

10. The method of lossy decoding of a bitstream data according to claim 8, wherein the step of replacing the display blocks includes replacing the display blocks with repaired blocks.

11. The method of lossy decoding of a bitstream data according to claim 10 further comprises the step of replacing the display blocks with previously repaired blocks.

12. The method of lossy decoding of a bitstream data according to claim 11 further comprises the step of filtering a previously repaired block before replacing the display block with the previously repaired block.

13. The method of lossy decoding of a bitstream data according to claim 12, wherein the step of filtering includes the step of updating low frequency interframe information of the display block.

14. The method of lossy decoding of a bitstream data according to claim 12, wherein the step of filtering includes the step of updating DC values motion components.

15. The method of lossy decoding of a bitstream data according to claim 1, wherein the step of replacing the display blocks having errors includes step of filtering block edges of replaced blocks to smoothen transitions between replaced blocks and not replaced blocks.

16. A method of decoding a plurality of image blocks comprising the steps of:

inverse quantizing the image blocks to provide an inverse quantize value for the display blocks;

storing a plurality of inverse quantize values to provide a predetermined inverse quantize value range;

inverse transforming the image blocks to provide an inverse transform value for the display blocks;

decoding a motion vector value for the display blocks; and checking the inverse quantize value to be within the predetermined inverse quantize value range;

modifying the inverse quantize value if the inverse quantize value is not within the predetermined inverse quantize value range.

17. The method of decoding a plurality of image blocks according to claim 16, wherein the step of:

checking includes checking the inverse transform value to be within a predetermined inverse transform value range; and modifying the inverse transform value if the inverse transform value is not within the predetermined inverse transform value range.

18. The method of decoding a plurality of image blocks according to claim 16, wherein the step of:

checking includes checking the motion vector value to be within a predetermined motion vector value range; and modifying the motion vector value if the inverse transform value is not within the predetermined motion vector value range.

19. The method of decoding a plurality of image blocks according to claim 17 further comprises the step of storing a plurality of inverse transform values to provide the predetermined inverse transform value range.

20. The method of decoding a plurality of image blocks according to claim 18 further comprises the step of storing a plurality of motion vector values to provide the predetermined motion vector value range.

* * * * *